United States Patent
Lederman et al.

(10) Patent No.: US 10,572,890 B2
(45) Date of Patent: Feb. 25, 2020

(54) BALANCING INVENTORY BY PERSONALIZED TRANSITION PLANNING

(71) Applicant: International Business Machines Corporation, Armonk, NY (US)

(72) Inventors: Roger D. Lederman, Braircliff Manor, NY (US); Rajesh Kumar Ravi, Yorktown Heights, NY (US); Thomas L. Scheid, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 14/814,027

(22) Filed: Jul. 30, 2015

(65) Prior Publication Data

US 2016/0328734 A1 Nov. 10, 2016

Related U.S. Application Data

(60) Provisional application No. 62/159,183, filed on May 8, 2015.

(51) Int. Cl.
*G06Q 30/02* (2012.01)
*G06Q 10/08* (2012.01)
*G06Q 30/06* (2012.01)

(52) U.S. Cl.
CPC ....... *G06Q 30/0223* (2013.01); *G06Q 10/087* (2013.01); *G06Q 30/0224* (2013.01); *G06Q 30/0631* (2013.01)

(58) Field of Classification Search
USPC ...................................................... 705/14.2
See application file for complete search history.

(56) References Cited

U.S. PATENT DOCUMENTS

| | | |
|---|---|---|
| 7,333,870 B2 | 2/2008 | Knipfer et al. |
| 8,407,110 B1 | 3/2013 | Joseph et al. |
| 8,527,322 B2 | 9/2013 | Ettl et al. |
| 8,650,079 B2 | 2/2014 | Fano et al. |
| 8,768,791 B2 | 7/2014 | Harper et al. |
| 2013/0185215 A1 | 7/2013 | Patrick et al. |
| 2013/0226636 A1 | 8/2013 | Hathaway et al. |
| 2014/0025422 A1 | 1/2014 | An et al. |

(Continued)

OTHER PUBLICATIONS

Blanchet et al., "A Markov Chain Approximation to Choice Modeling", EC'13, Jun. 16-20, 2013, Philadelphia, PA, vol. 9, No. 4, Article 39, Publication date: Jun. 2013.

(Continued)

*Primary Examiner* — Afaf Osman Bilal Ahmed
(74) *Attorney, Agent, or Firm* — Scully, Scott, Murphy & Presser, PC; Daniel P. Morris, Esq.

(57) ABSTRACT

System, method and computer program product for effective supply-side planning of inventories during product transitions. The system for a supply-side entity that generates recommendations that include personalized shaping actions to control each customer's rate of adoption of a new product to replace an older legacy product during a transition period, and optimize overall use of available supply. The method optimizes personalized shaping actions so that a customer is transitioned at a speed that suits their personal profile as well as the seller's production/inventory constraints for each product. Shaping actions are determined based on the trajectory of each product's lifecycle. Further, customer-level adoption patterns for transitioning products are predicted from past behavior.

20 Claims, 12 Drawing Sheets

(56) References Cited

U.S. PATENT DOCUMENTS

| | | |
|---|---|---|
| 2014/0122181 A1 | 5/2014 | Fisera et al. |
| 2014/0222506 A1 | 8/2014 | Frazer et al. |
| 2015/0045995 A1 | 2/2015 | Triezenberg |
| 2015/0066569 A1 | 3/2015 | Ervolina et al. |

OTHER PUBLICATIONS

Dietrich et al., "Optimizing the end-to-end value chain through demand shaping and advanced customer analytics", Proceedings of the 11th International Symposium on Process Systems Engineering, Jul. 15-19, 2012, Singapore.

Liu et al., "Personalized Point-of-Interest Recommendation by Mining Users' Preference Transition", CIKM'13, Oct. 27-Nov. 1, 2013, San Francisco, CA, USA.

$$v_t(I_t, S_t, M_t)$$

$$= \max_{(A_t, Z_t, D_t, L_t)} E \left[ \sum_{i,j} x_{t,i,j} m_j - \sum_j \left( \left[ \sum_i x_{t,i,j} - I_{t,j} \right]^+ c_{t,j}^P + \left[ I_{t,j} - \sum_i x_{t,i,j} \right]^+ c_j^H \right) \right.$$

$$\left. - \sum_{t,j} \left( Z_{t,i,j} c_j^T + D_{t,i,j} x_{t,i,j} c_i^D \right) + v_{n_{t+1}}(I_{t+1}, S_{t+1}, M_{t+1}) \right]$$

subject to: $A_{t,i,j} \leq M_{t,j}$ $D_{t,i,j} \leq Z_{t,i,j}$ $L_{t,i,j} + Z_{t,i,j} \leq A_{t,i,j} \quad \forall i, j$

$$= \max_{\{A_t, Z_t, D_t, L_t, O_t, W_t\}} E\left[\sum_{i,j} x_{t,ij} m_{ij} - \sum_j \left(\left(\sum_i x_{t,ij} - Q_{t,j}\right)^+ c_{t,j}^P + \left[Q_{t,j} - \sum_i x_{t,ij}\right]^+ c_j^R\right)\right.$$

$$\left. - \sum_{i,j} \left(Z_{t,ij} c_j^T + D_{t,ij} x_{t,ij} c_j^D\right) - \sum_{k,l} \left(w_{t,lk} c_{lk}^S\right)\right.$$

$$\left. + \gamma v_{t+1}(I_{t+1}, S_{t+1}, M_{t+1})\right]$$

subject to: $A_{t,ij} \leq M_{t,ij}$ $D_{t,ij} \leq Z_{t,ij}$ $L_{t,j} A^{t,j} \leq f^{t,j} Z + f^{t,j}$ $O_t \leq U I_t + \sum_l U w_{t,l}$ $0 \leq w_{t,lk} \leq W_{t,lk}$ $A, Z$

FIG. 5B

BALANCING INVENTORY BY PERSONALIZED TRANSITION PLANNING

BACKGROUND

The present invention relates generally to inventory management and supply-side planning, and in particular, to a system and method for balancing inventory during product transitions.

Product transitions are a challenge for supply chain managers as the adoption rates for new technology are difficult to predict and established processes for sourcing components may break down towards end of the product lifecycle. As a result, managers who underestimate the transition speed may be left with unusable inventory of a legacy product, whereas managers who scale down product too quickly may find they are unable to source for their demand or are otherwise subject to excessive costs for procurement.

From an operations perspective, past approaches do not take advantage of 1) the potential to personalize transition strategies by customer, based on that customer's preferences and tendencies towards fast adoption; and 2) the ability to implement demand-side actions, with a lead-time shorter than that of supply actions. The difficulty of last time-buys is well-known, and newsvendor-type models have been used to optimize this decision in the face of an uncertain adoption rate. However, inventory planning tools view this as a one-shot decision, and the length of supply lead times mean that there is great uncertainty in the decision-making and consequently poor results.

Furthermore, the decision is made on a single dimension what quantity to buy rather than taking a more granular view that involves rationing of supply to select customers and strategic use of substitutions/pricing to divert demand when necessary.

There are also prior art systems that are aimed solely at the demand-side, with the goal of leading customers to a product similar to one that has become obsolete. Such tools, while relevant, do not contain any aids for operational decision-making, nor can they be readily integrated into supply planning tools.

Further, from an operational perspective, it is not always the most similar product that is best to recommend, and furthermore the decision of whether/when to transition the customer may be made strategically.

BRIEF SUMMARY

In an aspect of the present disclosure, there is provided a system and method to solve the problem of inventory management during product transitions. The approach is to supplement traditional supply-side planning with personalized demand-shaping actions that maintain an optimal mix of fast and slow adoption patterns across the customer profile.

Thus, there is provided, in one embodiment, a method for managing an inventory of products. The method comprises: running a first model using historical data of many customers and their product purchase information to predict a customer's purchase preferences for a transitioning product and predict a product adoption speed; receiving, via an interface, parameters indicating transitioning products and current production capabilities and a cost(s) for procuring inventory for the new and legacy products; running a stochastic model that processes the transitioning products and current production capabilities parameters data, and the customer's predicted purchase preferences and adoption speed that accounts for the inventory and procurement costs, to generate an output transition plan for a customer that optimally balances a supply-side inventory level, and implementing the transition plan to control a speed of the customer's new product adoption.

There is further provided a system for managing an inventory of products. The system comprises: a memory; a processor device associated with a memory, the processor device configured to: run a first model using historical data of many customers and their product purchase information to predict a customer's purchase preferences for a transitioning product and predict a product adoption speed; receive, via an interface, parameters indicating transitioning products and current production capabilities and a cost(s) for procuring inventory for the new and legacy products; run a stochastic model that processes the transitioning products and current production capabilities parameters data, and the customer's predicted purchase preferences and adoption speed that accounts for the inventory and procurement costs, to generate an output transition plan for a customer that optimally balances a supply-side inventory level, and implement the transition plan to control a speed of the customer's new product adoption.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5A shows details of a first stochastic optimization model 200 generated and used by analytics engine;

FIG. 5B shows details of a second stochastic optimization model 250 generated and used by analytics engine;

DETAILED DESCRIPTION

A comprehensive system and method for balancing inventory through personalized transition shaping, which comprises at least the following novel aspects: integrated optimization of supply planning and demand shaping actions for transitioning products; and personalized shaping actions to control a rate of product adoption at the individual customer level.

Figure 1:
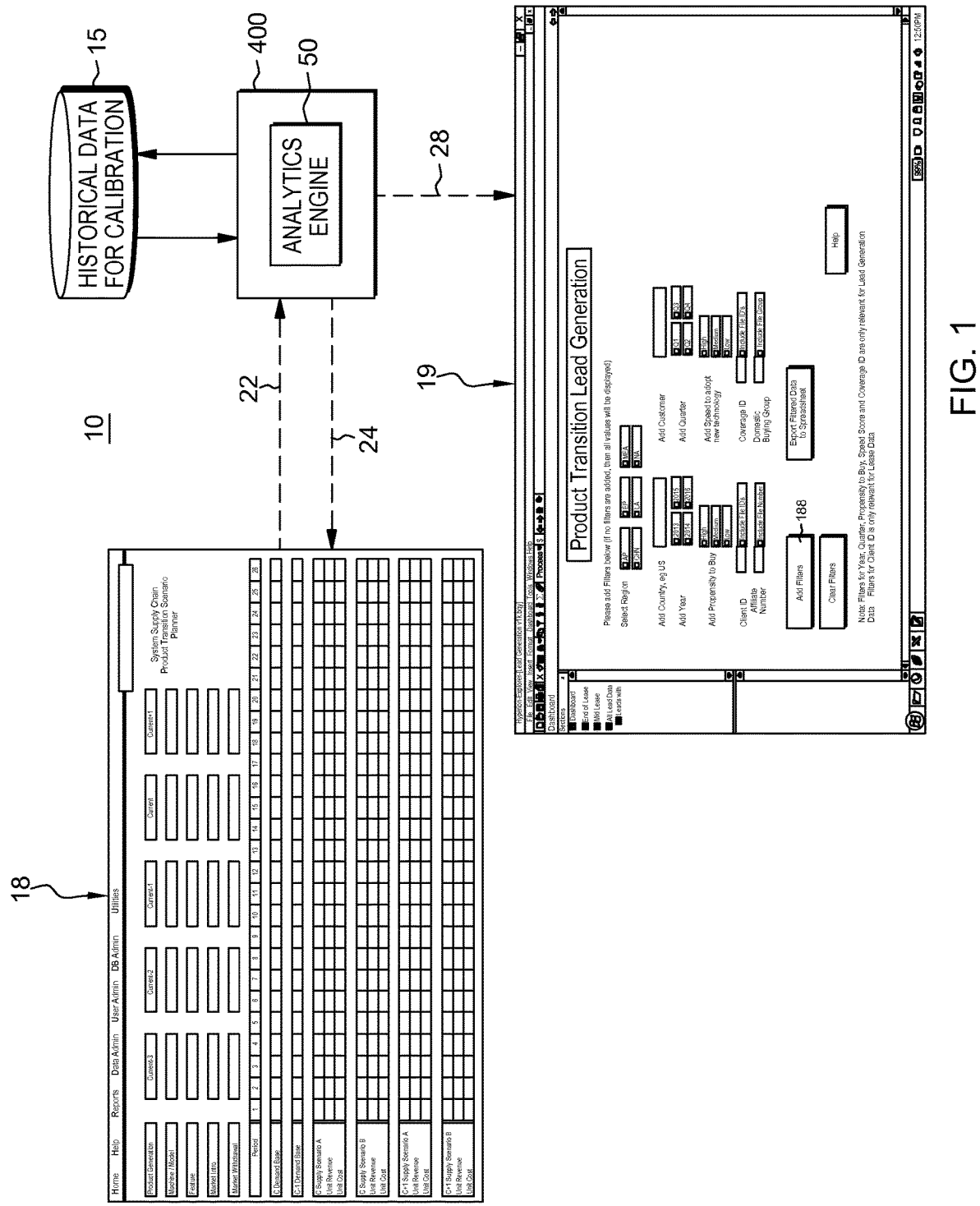
FIG. 1 shows a system 10 to balance inventory through personalized transition shaping.

FIG. 1 shows a system 10 to balance inventory through personalized transition shaping. The system is computer-implemented system including: a computing device 90, e.g., a server, work-station, desktop or like computing system, and associated memory storage device 20, e.g., a database, that stores historical data of many customers and their product information for use in model calibration. Data regarding transitioning products and current production capabilities are stored in data base 15, and are accessed by computing device 400 employing and running an analytics data processing engine 50. In this operation, a user sets parameters 22 to indicate transitioning products and current production capabilities via an interface 18 to the computer system 400. Details regarding an exemplary data input interface 18 for use in specifying sets of parameter data 22 will be described in greater detail herein below with respect to FIG. 7.

Computing device 400 receives the set of parameters 22 indicating transitioning products and current production capabilities via the interface. In particular, analytics engine 50 processes the transitioning products and current production capabilities parameters data 22 and employs the stored historical data 15 in a model that is run to generate actions for supply planning and/or personalized demand shaping indicated for a transitioning product(s) for a particular customer. In one embodiment, analytic engine component 50 generates a proposal of an optimized production plan 24 that may be returned to users for viewing via the interface 18. Alternatively, or in addition, analytic engine component 50 generates actions and provides an output via a further sales interface 19 including: recommendations for customer targeting and/or promotions 28. Details regarding an exemplary data output interface 19 for receiving recommendations and promotions 28 and/or an optimized production plan 28 will be described in greater detail herein below with respect to FIG. 6.

Figure 2A:
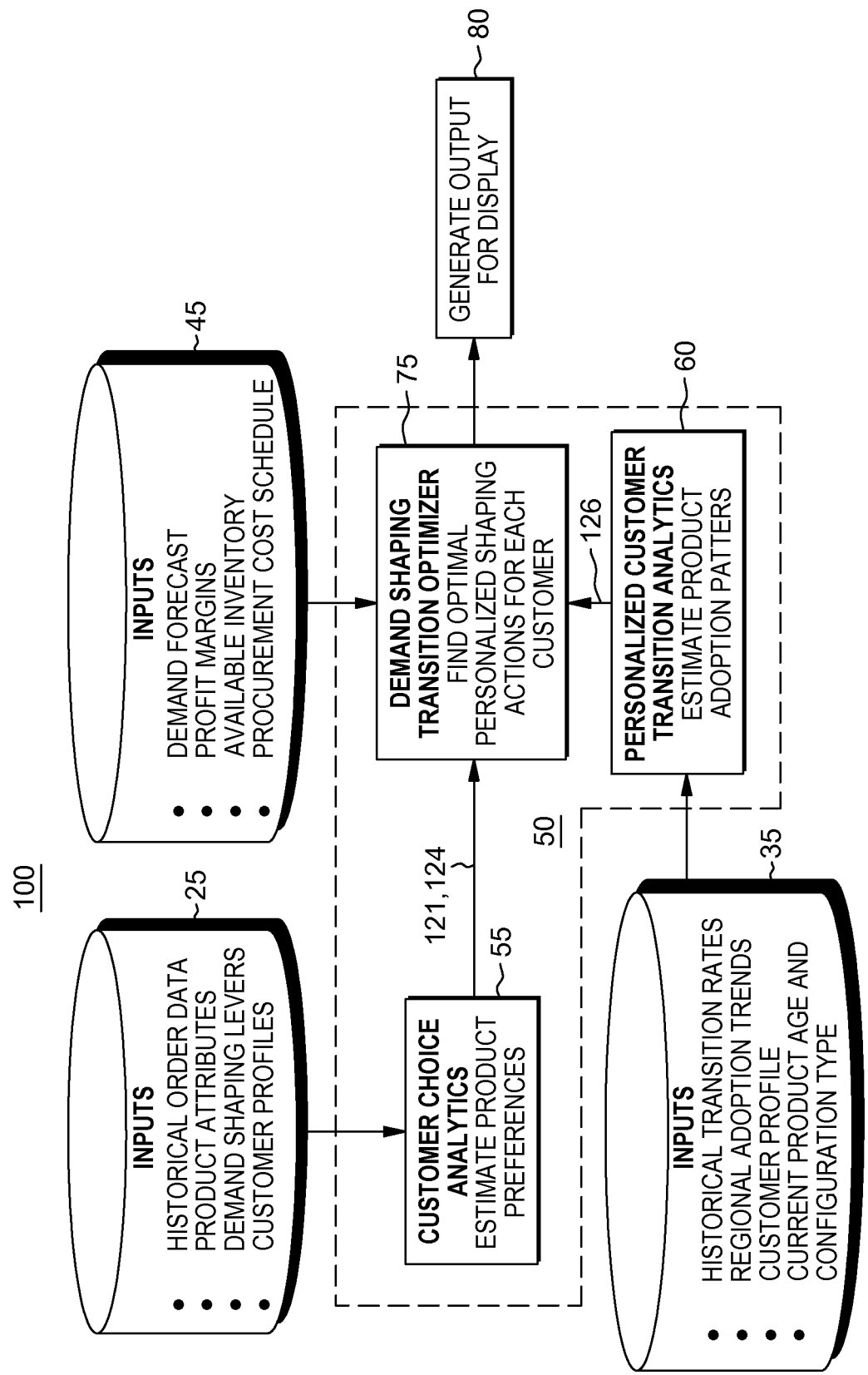
FIG. 2A is flow chart of a method 100 employed by the analytics engine 50 according to one embodiment.

FIG. 2A is the analytics flow 100 employed by the analytics engine 50 according to one embodiment. In the flow, there is performed estimating, for one or more customers, product preferences using a customer choice analytics component 55, employed by the engine 50. The analytics flow 100 includes estimating, for the customer(s), product adoption patterns using a personalized customer transition analytics component 60. Analytics flow further includes a demand shaping transition optimizer component 75 for finding optimal personalized shaping actions for the customer.

In one embodiment, the demand shaping transition optimizer component 75 computes and generates an output 80 including: customer target lists for legacy and new products including: inventory rationing levels and follow-on and substitute product recommendations; and demand shaping actions including: product availability actions; targeted price discount; and personalized bundling. Additionally, optimizer component 75 generates updated product forecasts. Thus, for example, it may be determined that a manufacturer of a "legacy" product x, i.e., a product nearing the end of its life, has determined there is excess inventory of certain items, e.g., product y and product z, such that a customer who may be transitioning from the "legacy" product x to a new product, may be offered additional products y and product z, e.g., at a discount, during a transition period. For example, given a customer's historical data, the method may determine (e.g., from that customer's past behavior of purchases of other products) which customers are "fast" adopters of new technology, or who are "slow" adopters of new technology, and the product supplying entity may adopt an inventory plan for both old and new products at the speed at which customers are expected to transition by using demand shaping actions to push certain customer's to transition faster or slower to keep the inventory balanced.

Figure 2B:
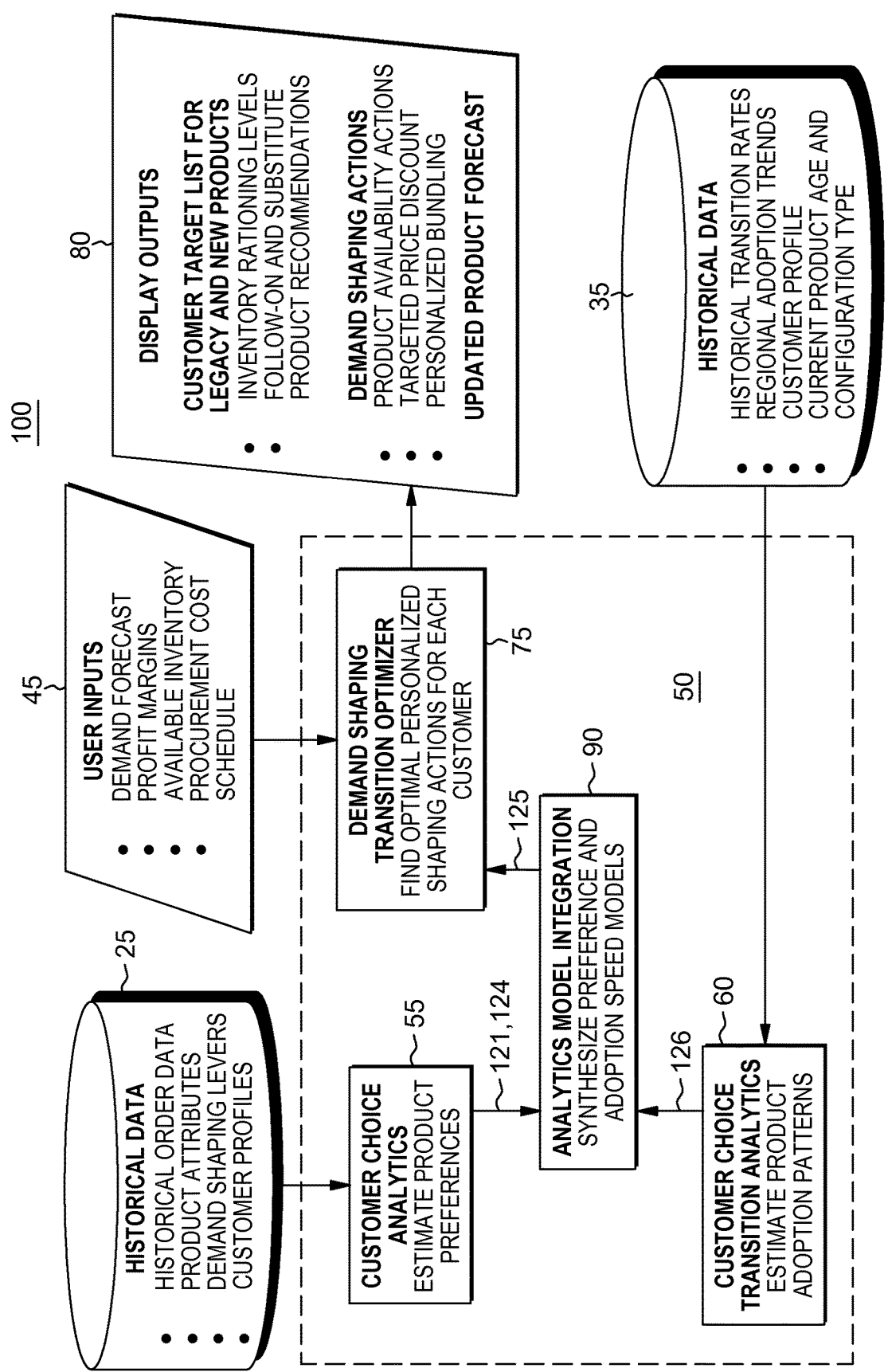
FIG. 2B is a flow chart of a further method 101 employed by the analytics engine 50 according to one embodiment.

In making this determination, as shown in the analytics flow 101 of FIG. 2B, the customer choice analytics component 55 accesses a database 25 and receives input including: the customer's historical order data (for products), product attributes of the transitioning product, demand shaping levers and customer profile data. In one embodiment, demand shaping "levers" include but are not limited to: selectively restricting legacy system availability (fully or partially, e.g., through extended SLA lead-times), proactively target for new models, and discounting price for excess supply. Customer choice analytics block 55 generates data 121, 124 for input to analytics modeling integration block 90 that synthesizes preference and adoption speed models for a customer. Further, the personalized customer transition analytics component 60 accesses a database 35 and receives input including: historical transition rate(s) information, regional adoption trend(s) information, customer profile information and information about the current product age and configuration type. As described in detail below with respect to FIG. 3, Personalized Customer Transition Analytics block 60 generates data 126 for input to the analytics modeling block 90 that synthesizes preference and adoption speed models for a customer. Further, the demand shaping transition optimizer component 75 accesses a database 45 and receives specified inputs from interface 18 including: a customer demand forecast for the transitioning product, profit margins for the supply-side entity associated with sales of the transitioning product, available inventory and a procurement cost schedule and receives the synthesized preference and adoption speed model 125 for processing by a dynamic and stochastic optimizer to optimize the demand shaping actions for each customer.

That is, there is generated a model 125 for the individual customer which is run to determine when that customer is likely to transition on to a new product, and what can be done to accelerate or temper that customer's rate of transition, and devise actions at the customer level to determine who (which customer) is going to be targeted for a new product and influence the actions of that customer for supply-side optimized inventory balancing.

Figure 3:
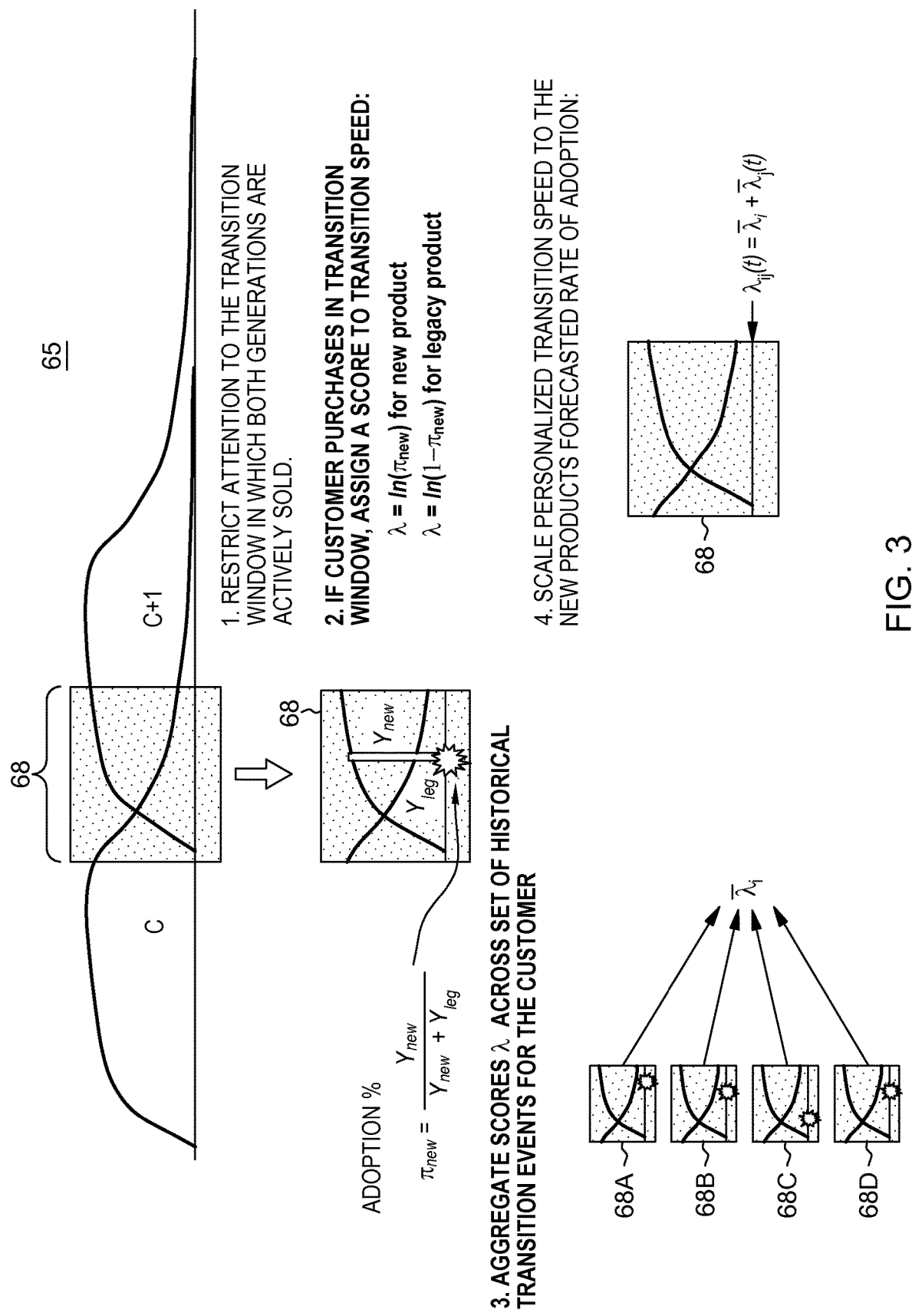
FIG. 3 shows an embodiment of the processing 65 performed in Personalized Customer Transition Analytics block 60 in one embodiment.

FIG. 3 shows an embodiment of the processing 65 performed in Personalized Customer Transition Analytics block 60. In particular, the processing 65 in block 60 is to drill down to a specific transition window 68 of time in which both generations of product are actively being sold by the supplier. This time period is depicted in FIG. 3 as a transition window 68 showing a total sales of each of two products (a sale at a given time), across all customers who have adopted the new product, occurring at an intersection between a demand trajectory for the current generation product "C" being transitioned and the demand for a next generation product C+1. During this time interval 68, block 60 determines if the customer conducted purchases of the legacy product or new product during the time of transition window 68, then a score λ is assigned to the customer's transition speed according to one of:

$$\lambda = \ln(\pi_{new}) \text{ for new product; or}$$

$$\lambda = \ln(1 - \pi_{new}) \text{ for legacy product.}$$

where $\pi_{new}$ is the adoption % probability. In this embodiment, $\pi_{new}$ is computed according to:
$\pi_{new} = y_{new}/y_{new} + y_{leg}$ where $y_{new}$ and $y_{leg}$ are shown depicted as all customer purchases for a product within the transition window 68. Then, the processing 65 of block 60 performs aggregating λ scores across a set of historical transition events for the customer as depicted in various transition windows 68A, 68B, 68C, and 68D for various past product transitions to arrive at an aggregate score $\bar{\lambda}_i$. Thus, for example, if a new product is purchased at a time when $\pi_{new}$ is low, then the score would reflect early adoption (a lower transition score), however, if a legacy product is purchased at a time when $\pi_{new}$ is high, then the score would reflect slow adoption. Thus, a score $\bar{\lambda}_i$ will reflect a customer i's adoption speed relative to other customer j's adoption speeds $\bar{\lambda}_j$ for that same product. Here, the index j represents a specific product (e.g. "new" in the examples of FIG. 3 and FIG. 4. The adoption rate in λij(t) is made up of a component particular to the customer that is based on the historical transition analysis and a component specific to the product that is derived from a (currently exogenous) product demand forecast.

Finally, in a final processing step of method 65, block 60 scales the personalized transition speed to the new product's forecasted rate of adoption according to:

$$\lambda_{ij}(t) = \bar{\lambda}_i + \bar{\lambda}_j(t)$$

Figure 4:
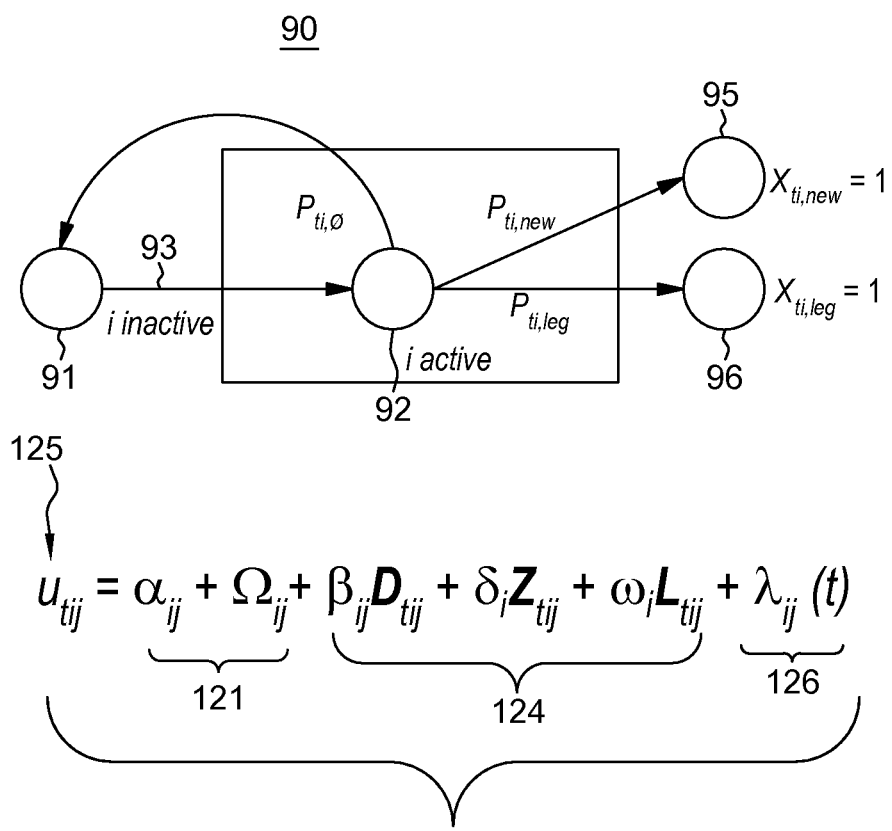
FIG. 4 shows an embodiment of an integrated utility model 90 for synthesizing preference and adoption speed models of a transitioning customer.

FIG. 4 shows an embodiment of an integrated utility model 90 of a transitioning customer that is generated by the analytics engine 50. This model 90 represents for a customer i, a probability of adopting a transitioning product. For example, based on received data input including: the customer's historical order data, product attributes of the transitioning product, demand shaping levers and customer profiles, an integrated "transitioning customer" model $\mu_{tij}$ 125 is generated according to equation 1) according to one embodiment as follows:

$$\mu_{tij} = \alpha_{tij} + \Omega_{ij} + \beta_{ij}D_{tij} + \delta_i Z_{tij} + \omega_i L_{tij} + \lambda_{ij}(t) \quad 1)$$

which may reveal, at a time t, a customer i arriving 93 from an inactive state 91 to active state 92, such that the arriving customer i purchases a product j where product j∈{new, leg, null} with a probability $P_{tij}$. A probability $P_{ti,new}$ 95 increases over time as the new product becomes established and the legacy product is being transitioned as represented by its purchase probability $P_{ti,leg}$ 96. It is understood that this transitioning customer model can be generalized to include a wider range of actions through the same type of system and models.

In one embodiment, $P_{tij}$ is computed based on the $\mu_{tij}$. There are three choices of j: new, leg (legacy), and null. The probability for new is computed as: $e^{(\mu_{tiNew})}/e^{(\mu_{tiNew})} + e^{(\mu_{tiLeg})} + e^{(\mu_{tiNull})}$). The other products are done analogously. The parameters that determine each $\mu_{tij}$ are estimated using maximum likelihood estimation. This framework is called a "multinomial log it choice model".

In one embodiment, referring back to FIG. 2B, components of the $\mu_{tij}$ model 125 are generated by the various analytic engine components. For example, returning to FIG. 4, the customer choice analytics component 55 (shown FIGS. 2A and 2B) runs a customer choice model 121 used in determining a value $\alpha_{tij}$ that the customer i takes from product attributes, and an additional value $\Omega_{ij}$ obtained from an optimal set of bundled features, i.e., when more than a single product is offered at the same time.

Further, in view of FIGS. 2A, 2B, and FIG. 4, the customer choice analytics component 55 further derives a demand shaping model component 124 which represents the expanded customer choice analytics that integrate historical shaping outcomes to model impacts of price discounts ($\beta_{ij}$) offered for a customer i's past purchase of product j, sales targeting ($\delta_i$), and extended lead-time ($\omega_i$) actions for past customer purchases during other product transitions. A lead-time, for example, is a time taken by the supplier to produce the customer product or the time taken to externally procure the material from an outside vendor for the purchasing customer's product. In the demand shaping modeling determination, variables $D_{tij}$ represents whether a discount was obtained for a past customer i purchase of product j at a transition time t; $Z_{tij}$ represents whether a past customer i purchase of product j was the subject to a sales targeting during a transition time t; and $L_{tij}$ represents a leadtime applicable for the past customer i purchase of product j at time t. Variables $D_{tij}$, $L_{tij}$ and $Z_{tij} \in (0, 1)$ (i.e., are binary variables).

Further, in view of equation 1), a further transition model component 126 is generated which includes a functional form $\lambda_{ij}(t)$ representing the customer's adoption patterns as observed in previous product transitions, relative to a launch date of a new product (i.e., "j=new"). For example, the personalized customer transition analytics components 60 of FIGS. 2A and 2B runs a personalized transition model 126 used in determining functional form $\lambda_{ij}(t)$.

At the analytics engine 50, a further stochastic optimization model 200 is generated such as shown in FIG. 5A. In particular, the demand shaping transition optimizer 75 that finds optimal personalized shaping actions for each customer runs a stochastic and dynamic optimization model 200 that generates data for controlling the speed of a customer's new product adoption through targeting and rationing actions. Values input for the this optimization processing include: $A_{tij}$ (a binary value (0 or 1) representing availability of the customer i to purchase a product j at time t); and the binary $Z_{tij}$ (representing whether the customer i was particularly targeted, e.g., by a sales agent, to influence that customer's purchase of product j involved, the binary $D_{tij}$ (representing whether the customer i's purchase of product j was discounted), and the binary $L_{tij}$ (representing the lead-time). Additionally, a stochastic outcome indicator variable $x_{tij}$ is generated having a distribution $P_{tij}$ ($A_{tij}$, $Z_{tij}$, $D_{tij}$, $L_{tij}$). The dynamic optimization model balances current profits with the costs of any shortage or excess in future periods.

At the analytics engine optimizer 75, the stochastic and dynamic optimization model 200 to be solved for inventory balancing includes forming a Markov Decision process (MDP) that models the following: states, actions and costs input data. Example "states" data in the model are represented as variables, including for example, product inventories $j_{tij}$, a customer status $S_{ti}$, and a product lifecycle status $M_{tj}$. The example "actions" data in the model are the binary $A_{tij}$, $D_{tij}$, $L_{tij}$ and $Z_{tij}$. Example costs include, a short-term procurement cost represented as variable $C_{tj}^P$, a product margin represented as variable $m_j$, an inventory holding cost represented as variable $C_j^H$, targeting costs represented as variable $C_j^T$, and a cost of discounts represented as variable $C_i^D$ for a customer i.

Thus, referring to FIG. 5A, in the method for balancing inventory through personalized transition shaping, the demand shaping transition optimizer component 75 of the analytics engine 50 solves the following optimization problem of equation 2) subject to the constraints indicated:

$$v_t(I_t, S_t, M_t) = \max_{(A_t, Z_t, D_t, I_t)} E \qquad 2)$$

$$\left[ \sum_{i,j} x_{tij} m_j - \sum_j \left( \left[ \sum_i x_{tij} - I_{tj} \right]^+ c_{tj}^P + \left[ I_{tj} - \sum_i x_{tij} \right]^+ c_j^H \right) - \right.$$

$$\left. \sum_{i,j} (Z_{tij} c_j^T + D_{tij} x_{tij} c_i^D) + \gamma v_{t+1}(I_{t+1}, S_{t+1}, M_{t+1}) \right]$$

subject to: $A_{tij} \leq M_{tj}, D_{tij} \leq Z_{tij}, L_{tij} + Z_{tij} \leq A_{tij} \forall i, j$ where E[ ] is the Expectation operator, $\gamma$ is a discount factor, and $I_{t+1}$, $S_{t+1}$, and $M_{t+1}$ represent respective product inventories, customer status and product lifecycle status at a subsequent time period t+1. The analytics engine 50 uses a high performance processing device, e.g., such as described herein below, to solve optimization equation 2) and compute for $v_t(\ )$ Given the combination of discrete variables and stochastic outcomes, an approach to solving equation 2) may differ based on model granularity, reflected in a number of periods, and a number of customers. As a larger problem, an approach may use continuous approximations to solve with approximate dynamic programming (estimate value functions and solve LP). Otherwise, smaller problems can be approached with combinatorial methods.

As mentioned, the system and method can compute an optimal transition plan for each customer using the stochastic model and accounting for portfolio inventory and procurement costs. An optimal transition plan computed from the optimization model of equation 2) for a customer i using stochastic model of purchase likelihood and accounting for portfolio inventory and procurement costs. In one embodiment, the transition plan for customer i is a set of binary $A_{tij}$, $D_{tij}$, $L_{tij}$ and $Z_{tij}$ taken for customer i over the range of values for t and informs what actions are taken with regards to that customer in each time t. The further function is an output $P_{tij}$ ($A_{tij}$, $Z_{tij}$, $D_{tij}$, $L_{tij}$) representing that once $A_{tij}$, $Z_{tij}$, $D_{tij}$, $L_{tij}$ values have been optimized the output $P_{tij}$, where i is the customer and j is the new product to see how the adoption probability will evolve over time under an optimal policy.

As mentioned, the system and method computes an optimal sales target list for each product generation based on current product lifecycle and solution of stochastic optimization model. This would include the optimal $A_{tij}$, $Z_{tij}$, $D_{tij}$, $L_{tij}$ for each customer at the current time t.

Further functionality provides for outputting a set of optimal demand shaping actions required to achieve a desired sales trajectory. In this embodiment, a sales trajectory of $P_{tij}$ ($A_{tij}$, $Z_{tij}$, $D_{tij}$, $L_{tij}$) over the range of t would give a sales trajectory for a single customer i and these may be added up over the whole customer set to get a product level sales trajectory.

Referring back to FIG. 2B, at the analytics engine 50, a further stochastic optimization model 250 is generated such as shown in FIG. 5B. In particular, the demand shaping transition optimizer 75 that finds optimal "supply-side" actions, e.g., a product supplier targeting customers or rationing. These supply-side actions for the product supplier are recommended by running the stochastic and dynamic optimization model 250 that generates data for controlling the speed of a customer's new product adoption through targeting and rationing actions.

Values input for this optimization processing include the binary variables: $A_{tij}$, $Z_{tij}$, $D_{tij}$, $L_{tij}$, the stochastic outcome indicator variable $x_{tij}$ with distribution $P_{tij}$ ($A_{tij}$, $Z_{tij}$, $D_{tij}$, $L_{tij}$). The stochastic optimization model 300, further models the allocation of component inventory $I_{tj}$ to discrete product inventory $Q_{tj}$ according to a feasibility matrix U that informs how to turn components into products. The dynamic model 300 balances current profits with the costs of any inventory shortages or excesses in future periods. Supply-side outputs are denoted by $Q_{tj}$ and $w_{tlk}$.

At the analytics engine optimizer 75, the stochastic and dynamic optimization model 300 to be solved for inventory balancing includes forming a Markov Decision process (MDP) that models the following: states, actions and costs data. Example "states" data in the model are represented as variables, however now including component inventories ($I_{tj}$), besides the customer status ($S_{ti}$), and a product lifecycle status $M_{tj}$. The example "actions" data in the model are the binary variables $A_{tij}$, $D_{tij}$, $L_{tij}$ and $Z_{tij}$ (a binary value (0 or 1), and Inventory Procurement $w_{tlk} \in Z$ (set of all positive integers). Example costs include, a short-term procurement cost represented as variable $C_{tj}^P$, a product margin represented as variable $m_j$, an inventory holding cost represented as variable $C_j^H$, targeting costs represented as variable $C_j^T$, a cost of discounts represented as variable $C_i^D$ for a customer i, and a further components cost variable $C_{lk}^S$ as indexed by a product l and where k represents a price tier (or price class).

Thus, referring to FIG. 5B, in the method for balancing inventory through supply-side actions, the demand shaping transition optimizer component 75 of the analytics engine 50 solves the following optimization problem of equation 3) subject to the constraints indicated:

$$v_t(I_t, S_t, M_t) = \max_{(A_t, Z_t, D_t, I_t, Q_t, w_t)} E \qquad 3)$$

$$\left[ \sum_{i,j} x_{tij} m_j - \sum_j \left( \left[ \sum_i x_{tij} - Q_{tj} \right]^+ c_{tj}^P + \left[ Q_{tj} - \sum_i x_{tij} \right]^+ c_j^H \right) - \right.$$

$$\left. \sum_{i,j} (Z_{tij} c_j^T + D_{tij} x_{tij} c_i^D) - \sum_{k,l} (w_{tlk} c_{lk}^s) + \right.$$

$$\left. \gamma v_{t+1}(I_{t+1}, S_{t+1}, M_{t+1}) \right]$$

subject to: $A_{tij} \leq M_{tj}, D_{tij} \leq Z_{tij}, L_{tij} + Z_{tij} \leq A_{tij} \forall i, j$ $Q_t \leq UI_t + \sum_i Uw_{ti}$ $0 \leq w_{tlk} \leq W_{tlk} \forall l, k$ where E[ ] is the Expectation operator, $\gamma$ is a discount factor and $I_{t+1}$, $S_{t+1}$, and $M_{t+1}$ represent respective component inventories, customer status and product lifecycle status at a subsequent time t+1, and where $W_{tlk}$ represents an amount of inventory available at a certain price point, with each index k representing a different price point or price class. The analytics engine 50 uses a high performance processing device, e.g., a server device, to solve optimization equation 3) and compute for $v_t(\ )$ Given the combination of discrete variables and stochastic outcomes, an approach to solving equation 3) may differ based on model granularity, reflected in a number of periods, and a number of customers. As a larger problem, an approach may use continuous approximations to solve with approximate dynamic programming (estimate value functions and solve LP). Otherwise, smaller problems can be approached with combinatorial methods.

Figure 6:
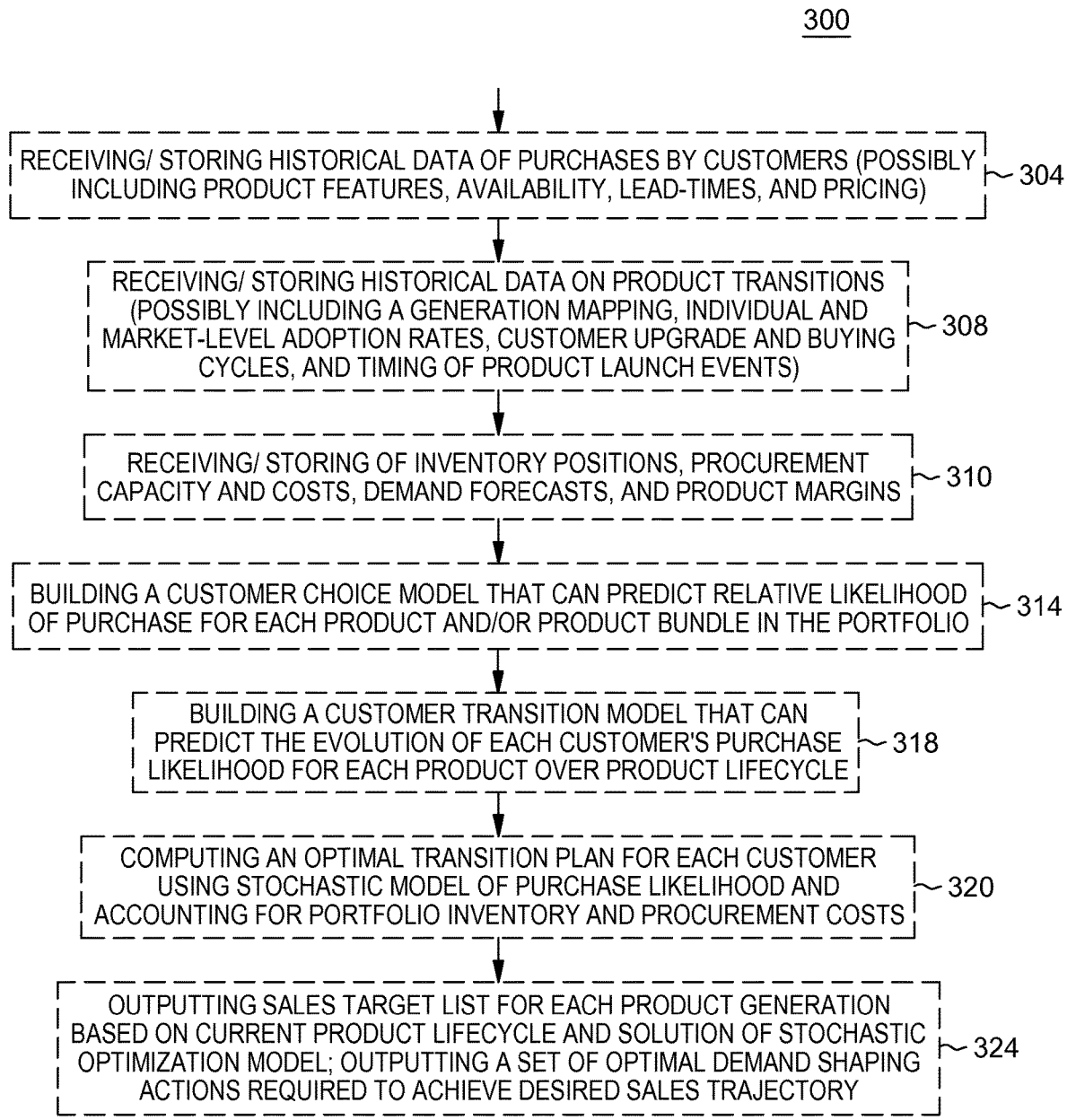
FIG. 6 depicts a general flow of the method 300 for balancing inventory through personalized transition shaping in one embodiment.

A general flow of the method 300 for balancing inventory through personalized transition shaping is now shown in FIG. 6. These steps may be performed by or for a supplier of the product(s) being transitioned. In a first step 304, the system receives or access from storage: historical data of purchases by customers, including any bids that the customer has either won or lost of products (to get idea of a customer's price sensitivity), and possibly including product features, customer/product availability, lead-times, and pricing information. Further, at 308, the system receives historical data on past product transitions, possibly including a generation mapping, individual and market-level adoption rates, customer upgrade and buying cycles, and timing of product launch events. Further, at 310, the system additionally receives inventory positions, procurement capacity and costs, demand forecasts, and product margins. Then, at 314, the analytics engine 50: builds the customer choice model 55 that can predict a relative likelihood of purchase for each product and/or product bundle in the portfolio; and at 318, builds the customer transition model 60 that can predict the evolution of each customer's purchase likelihood for each product over the product lifecycle. Then, at 320, the optimizer computes an optimal transition plan for each customer using stochastic model of purchase likelihood and accounting for portfolio inventory and procurement costs.

Further, at 324, the system outputs to a user a sales target list for each product generation based on current product lifecycle and solution of stochastic optimization model 200. Further, at 324 there is generated for output a set of recommendations to perform optimal demand shaping actions required to achieve the desired sales trajectory.

The generation of a recommendation (depending on all customers using the product in question and the remaining inventory): with a limited inventory, a customer may be targeted first when it has been determined that for that customer there is no good alternative for the transitioning product for that customer, and to recommend to them early to get them into a new product, whereas other customers may be approached to purchase substitute products by that supplier.

One example action may be automated, i.e., an action may be recommended to change a price of the product in question, and the change of price may occur in an automated fashion.

Figure 7:
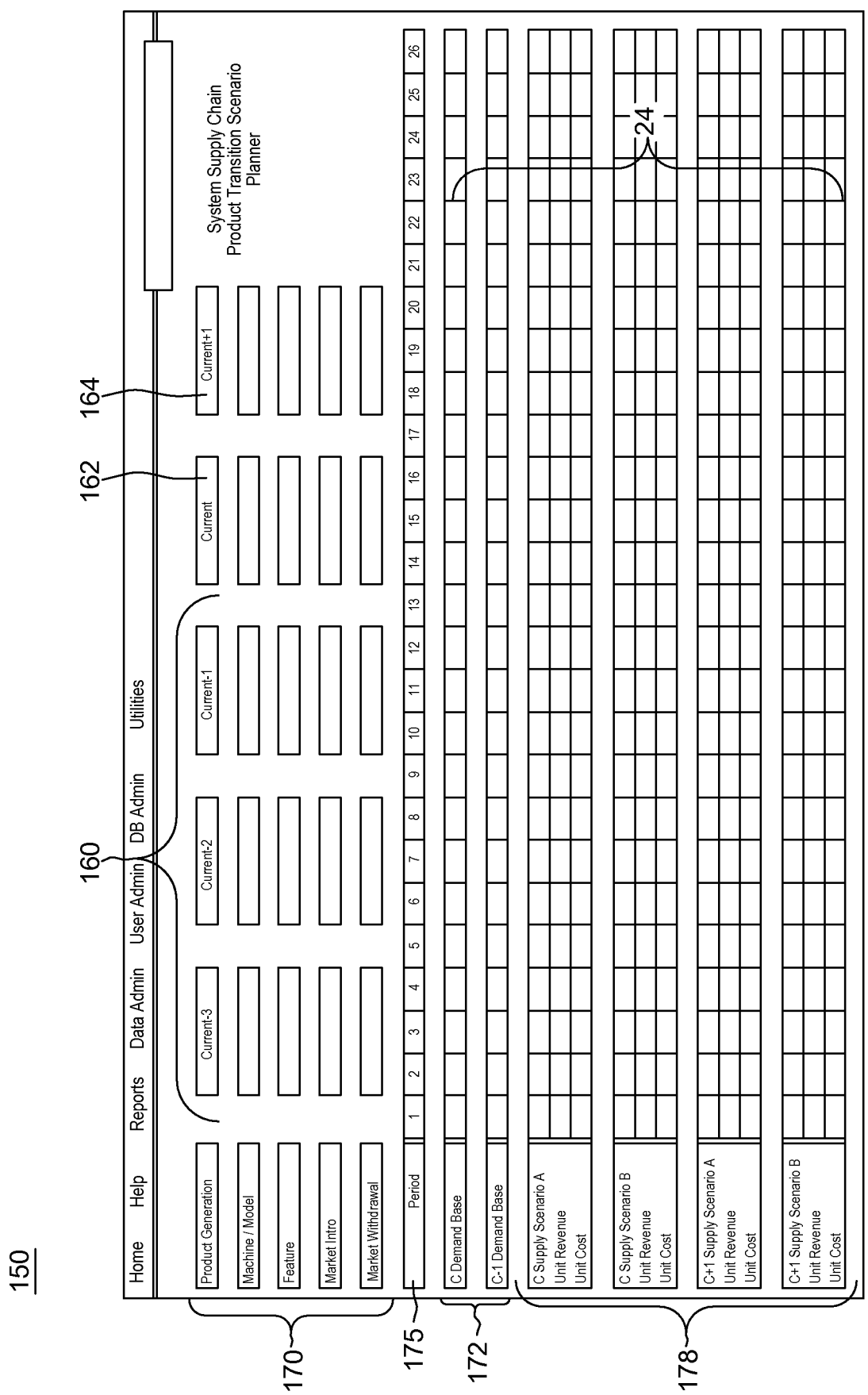
FIG. 7 depicts a computer screen interface 150 for use in specifying sets of parameter data for input to the analytics engine 50.

FIG. 7 depicts a computer screen interface 150 for planning a customer transition that is generated for presentation at a display device of the computing system 400 in one embodiment. The computer screen interface display 150 provides the means to input to the analytics engine 50 the sets of parameter data relating to specific baseline level of products 160 for each generation of product (e.g., C, C−1, C+1, etc.) including a current transitioning product 162 and a next generation product 164 for processing by the analytics engine 50. As shown, interface 150 provides a product transition scenario planner for receiving parameter inputs 160 such as, but not limited to: information 170 about past generations of predecessor products 160, current product 162 and next generation products 164. This entered data 170 includes the generation level, the type of product (e.g., machine/model), a product feature, a date of the product's entry into the market and a date of the product's withdrawal from the market. Entered information 172 further includes a forecast for both the demand, and the available supply over a set time horizon. As seen, demand base data estimates or forecasts 172 for the current (C) and past product generation (C−1) is entered for respective demand time periods t=1, 2, . . . (e.g., weeks) in corresponding fields 175. The costs for procuring inventory for the two products (current and next generation product), is additionally provided. Additionally input are one or more discrete supply side scenarios 178 indicating unit costs and revenue associated with each product purchase impacted in the scenario. The analytics engine 50 particularly will also receive/access further the customer historical data for calibrating the engine models 55, 60, 75, and using the models calibrated with the customer's historical data, will update a specific transition and generate a recommendation 24 of one or more revised (supply side) scenarios 178 recommending to the supplier (or a sales or operations planner) what could be made with available inventory and whether additional inventory is needed in the relevant time periods, via interface 150. That is, the system may re-populate the demand forecast and supply forecast over the period indicated in the scenarios 178. In one embodiment, each scenario is a way of expressing changing production costs for different supply plans (capturing economies of scale). Thus, a supply side scenario transition (optimized production plan) recommendation 24 may include unit revenue and unit costs for the current and transitioning products will be presented for the sales team. For instance, a supply planner may specify $W_{tlk}$ for multiple classes k which informs of the amount available at a certain price point, with each index k representing a different point, so as to obtain a piecewise linear cost function as a result. Otherwise, as will be discussed with respect to the interface provided in FIG. 8, analytics engine 50 generates output data 28 providing shaping action recommendations, e.g., tell a sales or operations planner to pursue one or more customers with one or more recommendations for one or more products, etc.

In one embodiment, assuming a full supply and demand forecast is obtained from the planner, as well as a cost schedule for acquiring additional inventory: the system then provides the planner (after optimization) with a new forecast for supply and demand reflecting the optimal plan. If the supply side changes, an action is triggered invoking the supply planner to procure additional supply.

The analytics engine 50 may further generate an output sales target list for each product generation based on current product lifecycle and the solution of the stochastic optimization models 200/250 of FIGS. 5A and 5B; and further generates an output set of optimal demand shaping actions required to achieve desired sales trajectory.

Figure 8:
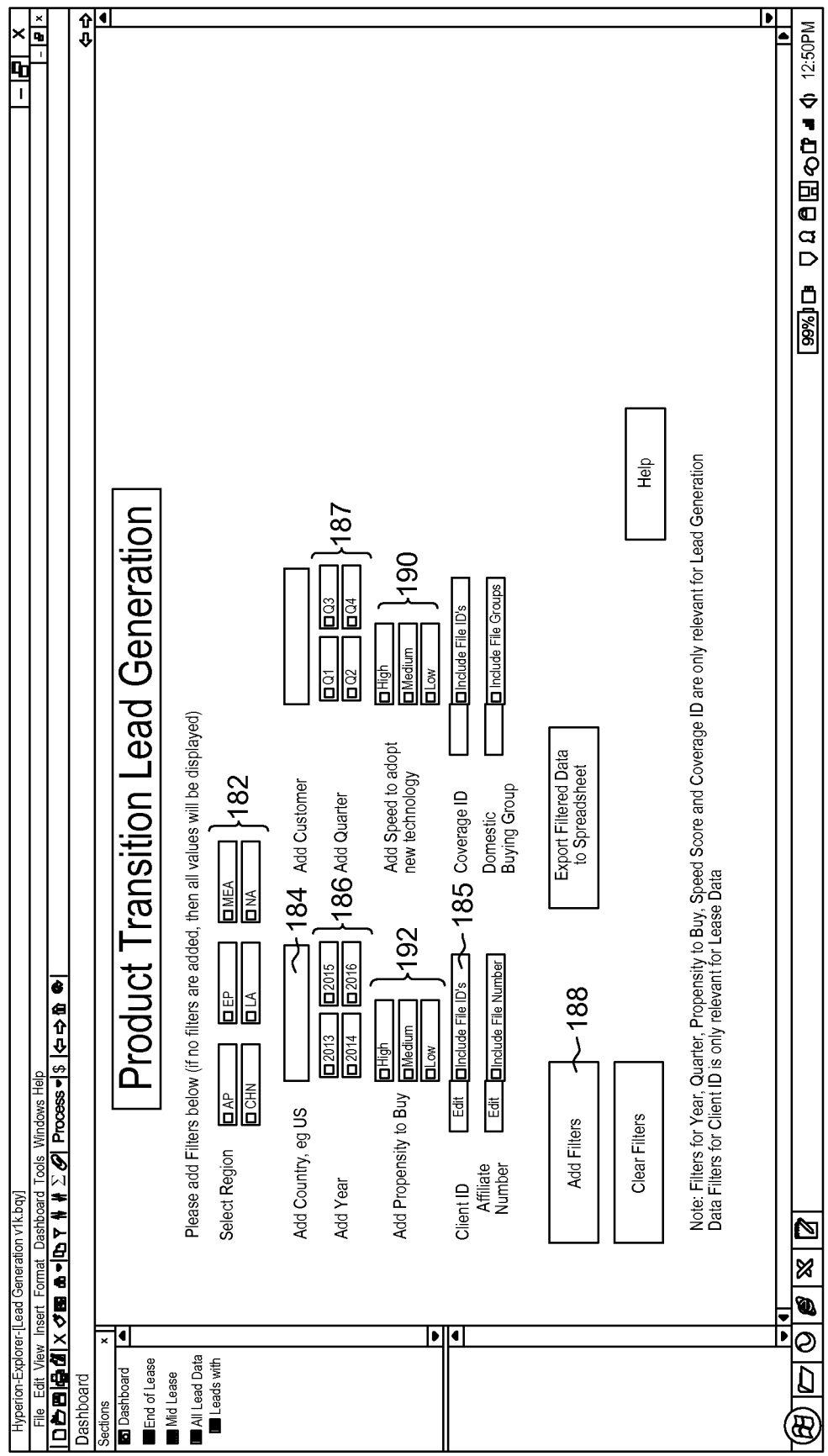
FIG. 8 depicts an exemplary data output interface 180 for displaying supplier action recommendations resulting the stochastic model solution for balancing inventory during the product transition period.
Figure 9:
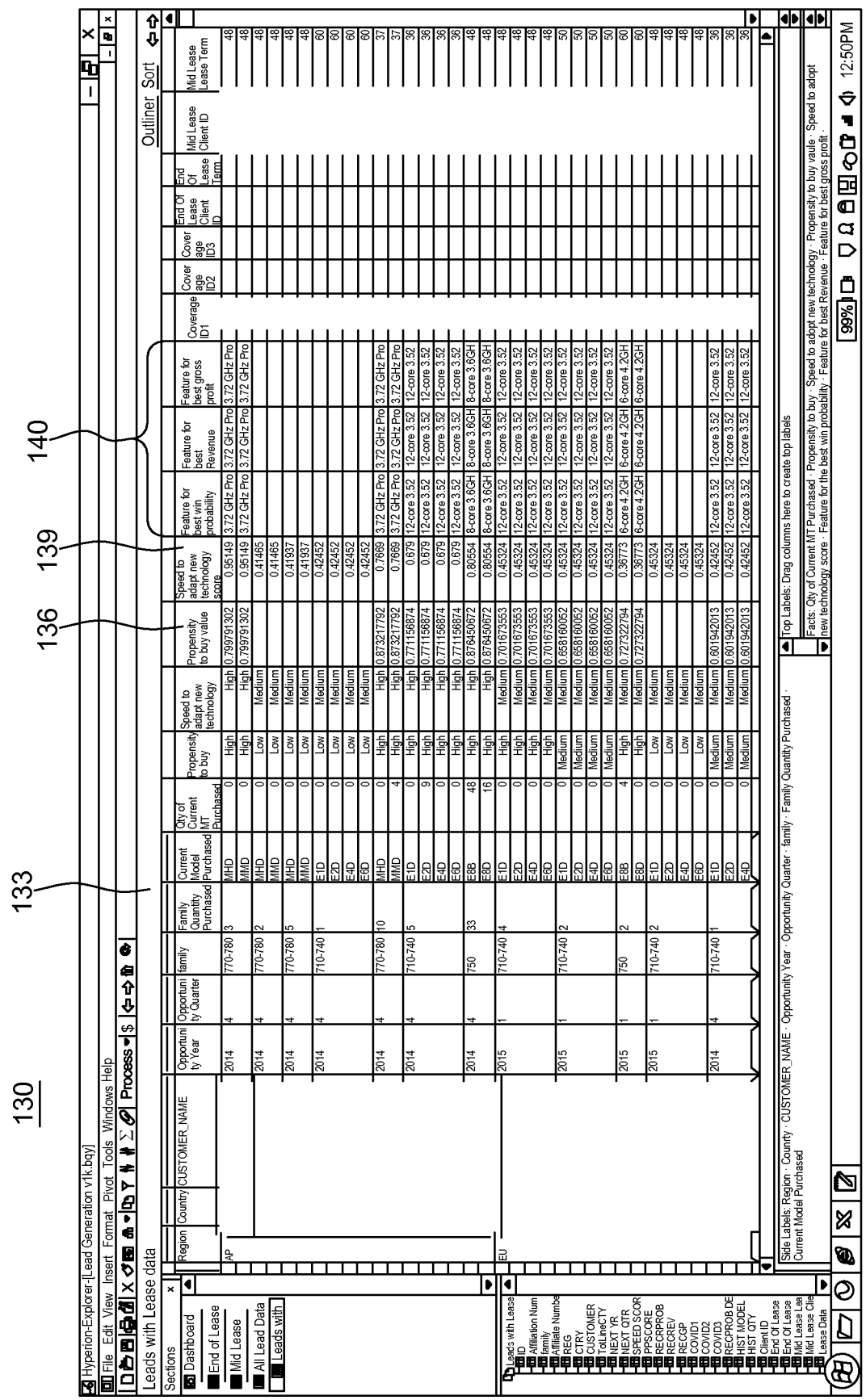
FIG. 9 is a further output display providing recommendations for demand shaping actions in one embodiment.

FIG. 8 depicts a computer screen interface 180 for receiving user filter selections to selected among various demand shaping action recommendations (e.g., product transition leads) that is generated for presentation at a display device, e.g., via the interface of 130 of FIG. 9 by the computing system 400, in one embodiment. The computer screen interface display 130 of FIG. 9, is an interface via which the actual stochastic and dynamic model output recommendations for the supply planner, are displayed, based on the selected filter settings of FIG. 8. Thus, a supplier may select a particular client 185 (e.g., if known) and receive all output recommendations for that customer. Otherwise, the user may select filter fields specifying: a region 182, a country 184, a year 186 and quarter 187, select a degree of a speed to adopt a new technology 190 for a customer and select a degree of a customer's propensity to buy 192, and an output 130 of FIG. 9 will be generated for the supply planners to inform them of possible demand shaping actions for that customer that balances the supplier's inventory for that product and accounting for other customer needs. Additionally, a supply planner may enter additional filter criteria for demand shaping actions by selecting the "add filters" select button 188. One demand shaping action may include providing a recommendation(s) to a sales agent(s) to contact a customer about purchasing a recommended product at a specific time. This may or may not include a discount and is captured in the integrated transitioning customer model of equation 1). That is, the use of targeting through sales contact at an optimal time is used as a lever to control the transition rate.

FIG. 9 depicts a computer screen interface 130 depicting an example sales action list that sets forth the recommendations for supply-side actions responsive to filter settings set forth in the interface screen 180 of FIG. 8. The actual recommendations are shown at a detailed level, including columns 140 directed to specific product (via their features), that is, columns 140 indicating "feature for best win probability, "feature for best revenue" and feature for best gross profit" recommends which product and product version (via its features). From this interface, a sales or supplier agent may more readily act to offer up new or substitute product(s), offer discounts, etc. based on these values. Moreover, an intermediate value in interface 130, i.e., "propensity to buy value" column 136 represent a function of the $\alpha_{tij}$ output generated by the customer choice analytics model 55; and an intermediate value in interface 130, i.e., a "Speed to adopt new technology score" column 139 represents a function of the $\lambda$ score generated by the personalized customer transition analytics model 60. Thus, once the optimization is performed, the columns recommend, based on the selected filters, which products and which features should be offered.

The system and methods according to the present invention provide pro-active transition targeting that reduces risk of missed SLA and/or costly procurement of legacy systems at end of life while maintaining allocated inventory for late adopters.

The methods can be customized product and bundle recommendations increase customer satisfaction and improve retention of customers across product generations.

The methods can be used for a wide range of supply chains where multiple product generations are sold simultaneously.

Figure 10:
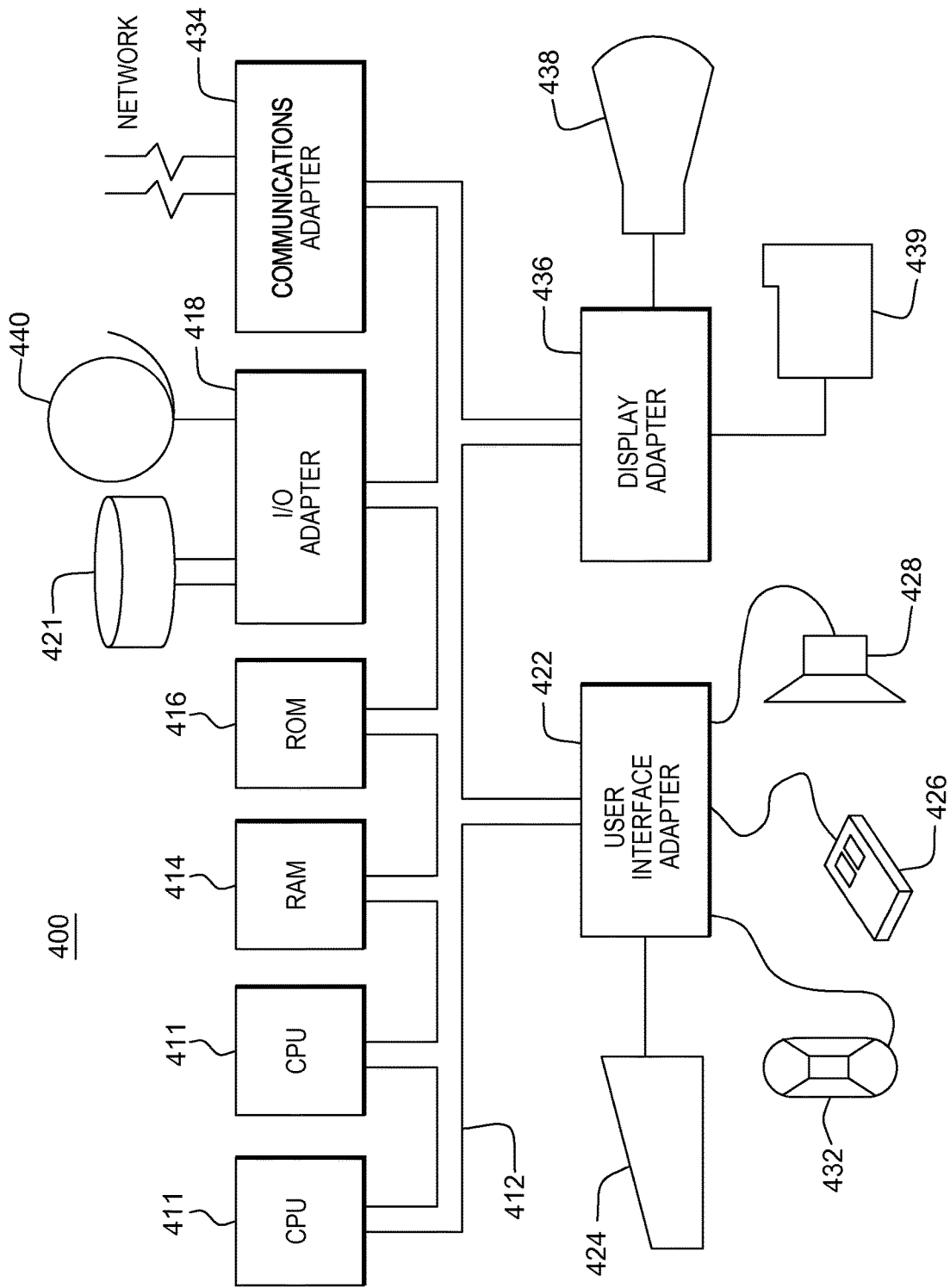
FIG. 10 depicts an exemplary hardware configuration for performing the methods described herein in one embodiment.

FIG. 10 illustrates one embodiment of an exemplary hardware configuration of a computing system 400 programmed to perform the method steps for balancing inventory by personalized transition planning as described herein with respect to FIG. 6. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing an inventory of products comprising:
    a memory;
    a processor device associated with a memory, said processor device configured to:
    build a first model using historical data of many customers and their product purchase information;
    receive an input indicating a customer;
    run the first model with the input to generate customer data indicating a prediction of purchase preferences of the customer for a transitioning product, and a product adoption speed of the customer;
    receive, via a first interface, parameter data indicating at least current production capabilities and a cost(s) for procuring inventory for the transitioning product, a set of new products and a set of legacy products;
    input the customer data and the parameter data to a stochastic model;
    run the stochastic model with the inputted customer data and parameter data to generate an output transition plan corresponding to the customer, wherein the outputted transition plan indicates a recommendation to perform at least a demand shaping action on the customer data to balance an inventory of the transitioning product;
    output the transition plan on a second interface;
    receive, via the second interface, a selection of one of the outputted demand shaping actions;
    implement, autonomously, the selected demand shaping action to adjust the product adoption speed of the customer indicated in the customer data;
    determine the inventory of the transitioning product based on the adjusted product adoption speed; and
    output the determined inventory of the transitioning product on the first interface.

2. The system as claimed in claim 1, wherein said processor device is further configured to:
    run the stochastic model to generate an output optimized product production plan for a supply-side entity including an inventory rationing level for said transitioning product.

3. The system as claimed in claim 1, wherein the optimal transition plan includes demand shaping actions for one or more customer targets for a legacy product, a new product or both a legacy and a new product, said demand shaping actions comprising one or more of:
    an action to make another product or products available as the one or more customer targets transition from the legacy product to the new product;
    an action to provide a targeted price discount for a new product, legacy product or other available products;
    a recommendation to a sales agent to contact a customer about purchasing a recommended product at a specific time; or
    an action to offer a personalized bundling of products for the target customer.

4. The system as claimed in claim 3, further comprising using said demand shaping actions to:
    run the stochastic model to modify an inventory plan for both legacy and new products at the customer's predicted transitioning product adoption speed, wherein customer's are influenced to transition faster or slower to keep a supplier's inventory balanced.

5. The system as claimed in claim 1, wherein said processor device is further configured to:
estimate for a customer i, a probability of adopting a transitioning product based on the received data input; and
wherein the first model $\mu_{tij}$ is built according to:

$$\mu_{tij}=\alpha_{tij}+\Omega_{ij}+\beta_{ij}D_{tij}+\delta_i Z_{tij}+\omega_i L_{tij}+\lambda_{ij}(t)$$

where, t is an estimated transition time a customer i arrives from an inactive state to active state, such that the arriving customer i purchases a new product j;
wherein value $\alpha_{tij}$ is a value that is based on product attributes, and
wherein $\Omega_{ij}$ is an additional value from an optimal set of bundled features when determined that more than a single product is being offered at the same time,
($\beta_{ij}$) are price discounts offered for a customer i's past purchase of product j,
($\delta_i$) represents the use of customer sales targeting,
($\omega_i$) are extended lead-time actions for past customer purchases during other product transitions; and
$D_{tij}$ is a variable representing whether a discount was obtained for a past customer i purchase of product j at a transition time t;
$Z_{tij}$ is a variable representing whether a past customer i purchase of product j was the subject to a sales targeting during a transition time t;
$L_{tij}$ is a variable representing a leadtime applicable for the past customer i purchase of product j at time t, wherein $D_{tij}$, $L_{tij}$ and $Z_{tij}$ are binary variables, and
$\lambda_{ij}(t)$ is a function representing a customer i's adoption patterns as observed in past product transitions, relative to a launch date of a new product.

6. The system as claimed in claim 5, wherein said processor device is further configured to:
optimize demand shaping actions for each customer for inventory balancing by:
modeling states, actions and costs input data as a Markov Decision process (MDP) optimization problem wherein said "states" input data represented as variables, including one or more of: a product inventories $I_{tj}$, a customer status $S_{tj}$, and a product lifecycle status $M_{tj}$, said "actions" input data are said one or more of a binary variables $D_{tij}$, $L_{tij}$ and $Z_{tij}$ and a binary variable $A_{tij}$ representing an availability of the customer i to purchase a product j at time t, said costs include, a short-term procurement cost represented as variable $C_{tj}^P$, a product margin represented as variable $m_j$, an inventory holding cost represented as variable $C_j^H$, targeting costs represented as variable $C_j^T$, and a cost of discounts represented as variable $C_i^D$ for a customer i; and
solve the MDP optimization problem subject to the set of constraints to compute the output transition plan for each customer accounting for portfolio inventory and said costs.

7. The system as claimed in claim 6, wherein said processor device is further configured to:
compute said optimal transition plan for a customer i as a set of binary $A_{tij}$, $D_{tij}$, $L_{tij}$ and $Z_{tij}$ taken for customer i over a range of values for time t where j is the new product.

8. The system as claimed in claim 6, wherein said processor device is further configured to:
compute said optimal transition plan for a customer i as an output $P_{tij}$ ($A_{tij}$, $Z_{tij}$, $D_{tij}$, $L_{tij}$) required to achieve a desired sales trajectory of $P_{tij}$ ($A_{tij}$, $Z_{tij}$, $D_{tij}$, $L_{tij}$) over the range of t, said sales trajectory for a single customer i and combined over a customer set to get a product level sales trajectory, where $P_{tij}$ is a purchase probability.

9. The system as claimed in claim 6, wherein said modeling a state variable in said Markov Decision process (MDP) optimization problem further comprises: component inventories ($I_{tj}$), said "actions" data further comprising an Inventory Procurement variable $w_{tlk}$; a discrete product inventory $Q_{tj}$, and a feasibility matrix U specifying how to turn components into products, and
an additional components cost variable $C_{lk}^S$ as indexed by a product l and where k represents a price tier.

10. The system as claimed in claim 5, wherein said processor device is further configured to compute said $\lambda_{ij}(t)$ by:
determining a specific transition window of time in which both legacy and new product are actively being sold by the supplier entity;
determining if the customer conducted past purchases of the legacy product or new product during the time of transition window, and assigning a score $\lambda$ to the customer's transition speed according to one of:

$\lambda=\ln(\pi_{new})$ for new product; or $\lambda=\ln(1-\pi_{new})$ for legacy product, where $\pi_{new}$ is an adoption % probability based on one or more customer purchases for a product within the transition time window; and
aggregating $\lambda$ scores across a set of historical transition events for the customer in various transition time windows associated with various other past product transitions to generate an aggregate score $\overline{\lambda}_i$, said aggregate score $\overline{\lambda}_i$ representing a customer i's adoption speed relative to other customers' adoption speeds for that same product.

11. A computer-implemented method for managing an inventory of products comprising:
building, by a processor, a first model using historical data of many customers and their product purchase information;
receiving, by the processor, an input indicating a customer;
running, by the processor, the first model with the input to generate customer data indicating a prediction of purchase preferences of the customer for a transitioning product, and a product adoption speed of the customer;
receiving, by the processor via a first interface, parameter data indicating at least current production capabilities and a cost(s) for procuring inventory for the transitioning product, a set of new products and a set of legacy products;
inputting, by the processor, the customer data and the parameter data to a stochastic model;
running, by the processor, the stochastic model with the inputted customer data and parameter data to generate an output transition plan corresponding to the customer, wherein the outputted transition plan indicates a recommendation to perform at least a demand shaping action on the customer data to balance an inventory of the transitioning product;
outputting, by the processor, the transition plan on a second interface;
receiving, by the processor via the second interface, a selection of one of the outputted demand shaping actions;

implementing, by the processor autonomously, the selected demand shaping action to adjust the product adoption speed of the customer indicated in the customer data;

determining, by the processor, the inventory of the transitioning product based on the adjusted product adoption speed; and outputting, by the processor, the determined inventory of the transitioning product on the first interface.

12. The method as claimed in claim 11, further comprising:

running the stochastic model to generate an output optimized product production plan for a supply-side entity including an inventory rationing level for said transitioning product.

13. The method as claimed in claim 11, wherein the optimal transition plan includes demand shaping actions for one or more customer targets for a legacy product, a new product or both a legacy and a new product, said implementing demand shaping actions comprising one or more of:

making another product or products available as the one or more customer targets transitions from the legacy product to the new product;

providing a targeted price discount for a new product, legacy product or other available products;

recommending a sales agent to contact a customer about purchasing a recommended product at a specific time; or offering a personalized bundling of products for the one or more customer targets.

14. The method as claimed in claim 13, further comprising:

running the stochastic model to modify an inventory plan for both legacy and new products at the customer's predicted transitioning product adoption speed, wherein customer's are influenced to transition faster or slower to keep a supplier's inventory balanced.

15. The method as claimed in claim 11, further comprising:

estimating for a customer i, a probability of adopting a transitioning product based on the received data input; and wherein building the first model $\mu_{tij}$ is according to:

$$\mu_{tij}=\alpha_{tij}+\Omega_{ij}+\beta_{ij}D_{tij}+\delta_i Z_{tij}+\omega_i L_{tij}+\lambda_{ij}(t)$$

where, t is an estimated transition time a customer i arrives from an inactive state to active state, such that the arriving customer i purchases a new product j; and $\alpha_{tij}$ is a value that is based on product attributes;

$\Omega_{ij}$ is an additional value from an optimal set of bundled features when determined that more than a single product is being offered at the same time;

($\beta_{ij}$) are price discounts offered for a customer i's past purchase of product j, ($\delta_i$) represents a use of customer sales targeting, ($\omega_i$) are extended lead-time actions for past customer purchases during other product transitions; and $D_{tij}$ is a variable representing whether a discount was obtained for a past customer i purchase of product j at a transition time t;

$Z_{tij}$ is a variable representing whether a past customer i purchase of product j was the subject to a sales targeting during a transition time t; and $L_{tij}$ is a variable representing a leadtime applicable for the past customer i purchase of product j at time t, wherein $D_{tij}$, $L_{tij}$ and $Z_{tij}$ are binary variables, and $\lambda_{ij}(t)$ is a function representing a customer i's adoption patterns as observed in past product transitions, relative to a launch date of a new product.

16. The method as claimed in claim 15, further comprising:

optimizing demand shaping actions for each customer for inventory balancing by:

modeling states, actions and costs input data as a Markov Decision process (MDP) optimization problem wherein said "states" input data represented as variables, including one or more of: a product inventory $I_{tj}$, a customer status $S_{ti}$, and a product lifecycle status $M_{tj}$ said "actions" input data are said one or more of a binary variables $D_{tij}$, $L_{tij}$ and $Z_{tij}$ and a binary variable $A_{tij}$ representing an availability of the customer i to purchase a product j at time t, said costs include, a short-term procurement cost represented as variable $C_{tj}^P$, a product margin represented as variable $m_j$, an inventory holding cost represented as variable $C_j^H$, targeting costs represented as variable $C_j^T$, and a cost of discounts represented as variable $C_i^D$ for a customer i; and solving the MDP optimization problem subject to constraints to compute the output transition plan for each customer accounting for portfolio inventory and said costs.

17. The method as claimed in claim 16, further comprising:

computing said optimal transition plan for a customer i as a set of binary $A_{tij}$, $D_{tij}$, $L_{tij}$ and $Z_{tij}$ taken for customer i over a range of values for time t where j is the new product.

18. The method as claimed in claim 16, further comprising:

computing said optimal transition plan for a customer i as an output $P_{tij}$ ($A_{tij}$, $Z_{tij}$, $D_{tij}$, $L_{tij}$) required to achieve a desired sales trajectory of $P_{tij}$ ($A_{tij}$, $Z_{tij}$, $D_{tij}$, $L_{tij}$) over the range of, said sales trajectory for a single customer i and combined over a customer set to get a product level sales trajectory, where $P_{tij}$ is a purchase probability.

19. The method as claimed in claim 16, wherein said modeling a state variable in said Markov Decision process (MDP) optimization problem further comprises: modeling a component inventory variable ($I_{tj}$), said "actions" data further comprising an Inventory Procurement variable $w_{tlk}$; a discrete product inventory $Q_{tj}$, and a feasibility matrix U specifying how to turn components into products, and an additional components cost variable $C_{lk}^S$ as indexed by a product l and where k represents a price tier.

20. The method as claimed in claim 15, wherein said $\lambda_{ij}(t)$ is computed by:

determining a specific transition window of time in which both legacy and new product are actively being sold by the supplier entity;

determining if the customer conducted past purchases of the legacy product or new product during the time of transition window, and assigning a score λ to the customer's transition speed according to one of:

$$\lambda=\ln(\pi_{new}) \text{ for new product; or}$$

$$\lambda=\ln(1-\pi_{new}) \text{ for legacy product,}$$

where $\pi_{new}$ is the adoption % probability based on one or more customer purchases for a product within the transition time window; and aggregating $\lambda$ scores across a set of historical transition events for the customer in various transition time windows associated with various other past product transitions to generate an aggregate score $\bar{\lambda}_i$, said aggregate score $\bar{\lambda}_i$ representing a customer i's adoption speed relative to other customers' adoption speeds for that same product.

* * * * *